United States Patent

Hidaka et al.

[15] 3,681,518

[45] Aug. 1, 1972

[54] COLOR VIDEO SIGNAL CORRECTION SYSTEM

[72] Inventors: Tsuneyoshi Hidaka, Tokyo; Akiyoshi Morita, Yokohama; Yoshihiko Honjo, Yokohama; Takashi Nishimura, Yokohama, all of Japan

[73] Assignee: Victor Company of Japan, Ltd., Yokohama, Kanagawa-ken, Japan

[22] Filed: May 8, 1970

[21] Appl. No.: 35,813

[30] Foreign Application Priority Data

May 10, 1969 Japan ..........................44/36022
May 10, 1969 Japan ..........................44/36021

[52] U.S. Cl. ..........................178/5.2 R, 178/5.4 CD
[51] Int. Cl. ..........................H04n 5/76
[58] Field of Search .......178/5.2 R, 5.4 CR, 69.5 CB; 179/100.2 MI; 331/10, 11, 12

[56] References Cited

UNITED STATES PATENTS 3,504,111 3/1970 Sumida et al. ..................178/5.4
3,528,026 9/1970 Groendycke ..................331/11
3,433,903 3/1969 Murray et al. .............179/100.2
3,312,780 4/1967 Hurst et al. ...................178/5.4
3,507,983 4/1970 Leman ..........................178/5.4
3,213,192 10/1965 Jensen ..........................178/5.4
2,988,593 6/1961 Olive ............................178/5.4

*Primary Examiner*—Richard Murray
*Assistant Examiner*—Peter M. Pecori
*Attorney*—Louis Bernat

[57] ABSTRACT

A color video signal correction system for a video tape recorder removes stably differential frequency changes and differential phase shifts. The system comprises a trigger oscillator which oscillates in phase with a burst signal taken out of the chrominance signal. A phase comparator circuit means compares a phase of a horizontal synchronizing signal separated from a luminance signal, by a horizontal synchronizing separation circuit means, with a phase of a horizontal synchronizing signal delayed in one horizontal line scanning time from the separated horizontal synchronizing signal. The trigger oscillator is controlled by an output of the phase comparator.

7 Claims, 18 Drawing Figures

INVENTORS
TSUNEYOSHI HIDAKA
AKIYOSHI MORITA
YOSHIHIKO HONJO
TAKASHI NISHIMURA

BY Louis Bernat

ATTORNEY

INVENTORS
TSUNEYOSHI HIDAKA
AKIYOSHI MORITA
YOSHIHIKO HONJO
TAKASHI NISHIMURA
BY
ATTORNEY

INVENTORS
TSUNEYOSHI HIDAKA
AKIYOSHI MORITA
YOSHIHIKO HONJO
TAKASHI NISHIMURA
BY
ATTORNEY

INVENTORS
TSUNEYOSHI HIDAKA
AKIYOSHI MORITA
YOSHIHIKO HONJO
TAKASHI NISHIMURA
BY
ATTORNEY

COLOR VIDEO SIGNAL CORRECTION SYSTEM

This invention relates to a color video signal correction system and more particularly, to systems for removing frequency differential and phase differential errors from a color video signal, of an NTSC system, recorded on and reproduced from video tape recorders. The present invention is related with and improved over the invention described in the specification of the United States Patent application, Ser. No. 818223 now U.S. Pat. No. 3,614,304 filed on Apr. 22, 1969.

In general, variations occur in rotation mechanisms and power transmission mechanisms of a color video tape recorder. For example, these variations manifest themselves as variations in the velocity of the magnetic tape travel. As a result, a reproduced color video signal has differential frequency changes and differential phase shifts. These changes and shifts cause a change in the hue of a reproduced picture.

Many systems have heretofore been used to compensate for these differential changes and shifts. These conventional systems may be itemized and have respectively their own disadvantages as follows:

1. Direct Color Processing System

This type of system has a very narrow range of correction, and it necessitates the use of the so-called "intersync" and other similar devices. This makes the whole apparatus, including the video tape recorder, very complicated in construction and very large in size.

2. Line Sequential Color (LSC) System

This system necessitates a conversion between an NTSC signal and an LSC signal when color video signals are recorded on and reproduced from a color video tape recorder. This makes for complicated circuits.

3. Pilot System

This system relies on the insertion of a pilot signal when the color video signals are recorded. The use of a pilot signal deteriorates the reproduced color video signals.

4. Double Heterodyne System

In this system, the recording and reproducing of color video signals are effected in form of NTSC signals. However, a locked-oscillator is locked to a burst signal to make a correction digitally for each horizontal line scanning time. Therefore, it is impossible to completely remove differential frequency changes and differential phase shifts from the reproduced color video signals. More specifically, a burst signal is taken out of an input NTSC color signal and used to heterodyne and cause an oscillation in the same phase as said burst signal. The oscillation is sustained during one horizontal line scanning time. Therefore, it becomes difficult to maintain the oscillation in phase with the burst signal, if a change in speed is accumulated and a phase error is increased. In other words, the phase of the color video signal changes gradually, with respect to the position of the burst signal, in a ½, ⅔, ¾. . . horizontal line scanning time, thus causing a change in the hue of the reproduced image.

The present invention overcomes all the above described disadvantages of the conventional systems. In particular, it overcomes the disadvantages of the double heterodyne system.

Accordingly, a main object of this invention is to provide a color video signal correction system which permits the correction of an NTSC color video signal reproduced from a color video tape recorder. Here, an object is to completely remove differential phase shifts over a very wide range.

Another object of the invention is to provide a color video signal correction system which permits correction of an NTSC color video signal reproduced from a color video tape recorder. The correction is performed with respect to color sub-carrier signals. This system completely removes, over a wide range the differential frequency changes including the changes in a high frequency range, and differential phase errors. Thus, an object is to produce a stable reproduced signal with no change in hue.

Still another object of the invention is to provide a color video signal correction system which compensates for changes in an NTSC color video signal. In this connection, an object is to provide for slow motion and still motion playback without causing a change in hue.

A further object of the invention is to provide a color video signal correction system which can be used with a relatively simplified color video tape recorder having no capstan servo system. Here, an object is to correct a color video signal so as to record and reproduce a color video signal without differential frequency changes and differential phase shifts.

Additional objects as well as features and advantages of the invention will become apparent from the description set forth hereinafter when considered in conjunction with the accompanying drawings, in which.

Figure 1:
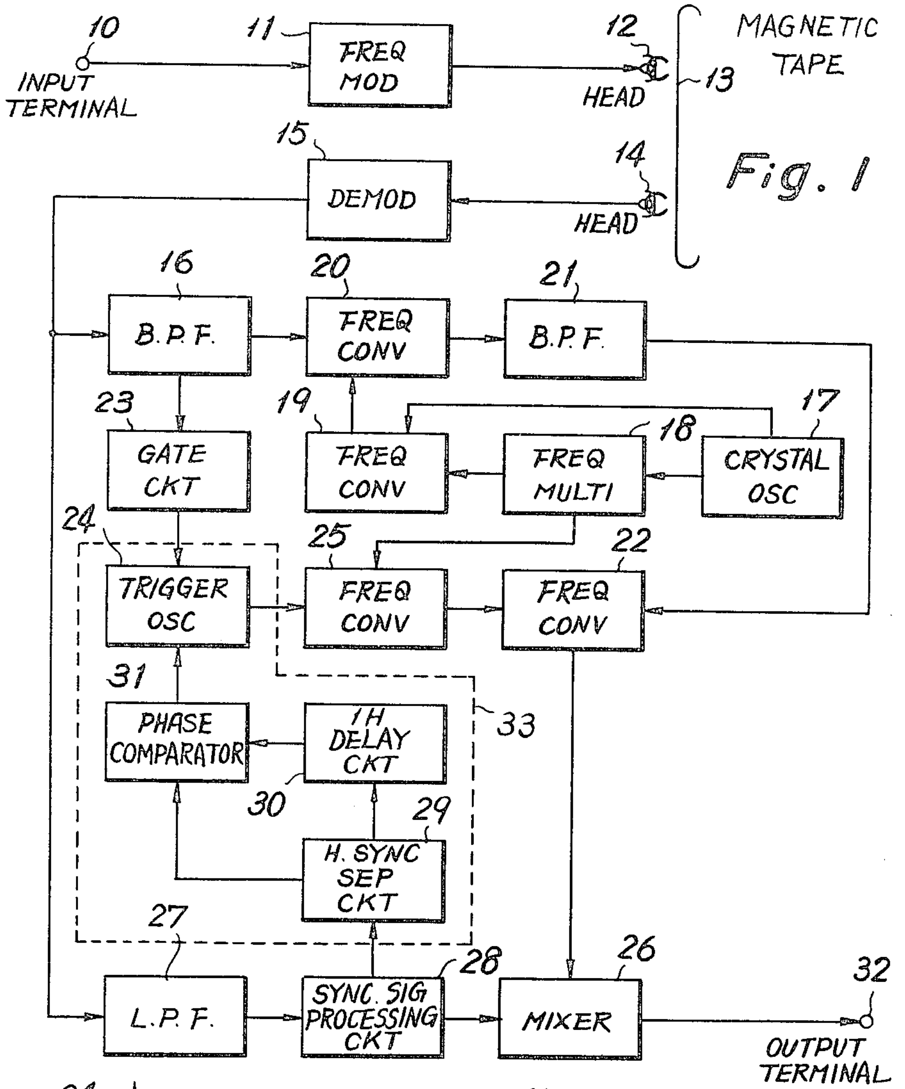
FIG. 1 is a block diagram of a first embodiment of the system according to this invention.

FIG. 1 shows a first embodiment of an inventive system for removing differential frequency changes. In FIG. 1, an NTSC color video signal is fed through an input terminal 10 to a frequency modulator 11. The resulting FM signal is recorded on a magnetic tape 13 by a magnetic recording head 12. The color video signal is played back or reproduced from the magnetic tape 13 by a magnetic reproducing head 14 connected to the input of a demodulator 15.

The reproduced color video signal is demodulated by the demodulator 15 and then fed into a band pass filter 16, of 3.58 MHz to filter out a chrominance signal. The color signal, thus filtered out, has a frequency $F_1$ which is expressed by the formula:

$$F_1 = (f \pm \Delta f) \pm \partial f$$

where:

$f$ — 3.58MHz, $\pm\Delta f$ — the side band wave of the chrominance signal, and $\pm\partial f$ — the differential frequency change occuring during the recording and playing back of the signal On the other hand, a frequency multiplier 18 multiplies the standard reference frequency of 3.58 MHz, produced by a crystal oscillator 17, $n$ times, to produce a frequency of $3.58n$ MHz.

The output of the oscillator 17 has its reference frequency multiplied into $3.58n$ MHz by the frequency multiplier 18. This multiplied frequency is combined with the signal of 3.58 MHz, supplied from the oscillator 17, by a frequency converter 19 to produce a signal having a frequency mf ($=3.58 \pm 3.58n$) MHz. The chrominance signal of the frequency of $F_1$ is supplied from the band pass filter 16. The signal of the frequency mf is supplied from the frequency converter 19 to a frequency converter 20 where it is converted into a signal of a frequency $F_2$. The frequency $F_2$ can be expressed by the formula $F_2 = (f \pm \Delta f) \pm \partial f + mf$. The output signal of the frequency converter 20 is supplied through a band pass filter 21 to a frequency converter 22.

The output signal of the band pass filter 16 is supplied to a burst gate circuit 23 which takes out a burst signal from the output signal of the filter 16. This burst signal is fed into a trigger oscillator circuit 24 having the oscillating frequency of 3.58 MHz. The trigger oscillator 24 is actuated by the burst signal, and it begins to oscillate in phase with the burst signal. This oscillation is sustained during one horizontal line scanning time. The output signal of the trigger oscillator 24 is a frequency $F_3$ which can be expressed by a formula $F_3 = 3.58\ \text{MHz} \pm \partial f$. The frequency of the output signal of the oscillator 24 is converted by a frequency converter 25, responsive to a signal of $3.58n$ MHz frequency supplied by the frequency multiplier 18. The resultant signal is a frequency $F_4$, which is then supplied to the frequency converter 22. The frequency $F_4$ can be expressed by the formula $F_4 = mf \pm \partial f$.

A signal is taken out of the frequency converter 22 which represents the frequency differential between the signals $F_2$ and $F_4$, or $F_2 - F_4 = (f \pm \Delta f) \pm \partial f + mf - mf \mp \partial f = f \pm \Delta f$. The signal, from which the frequency differential $\partial f$ is removed, is supplied to a mixer 26.

However, minute differential phase errors may not be completely removed by the abovementioned circuit constructions. If the frequency of the burst signal is at great variance with the natural resonance frequency, 3.58 MHz ($f$), of the trigger oscillator 24, the oscillation frequency which is locked to $f \pm \partial f$ gradually moves toward the natural resonance frequency. The error is maximized during the horizontal synchronizing signal time.

Figures 4A, 4B, 4C, 4D, 4E, 4F, 4G, 4H:
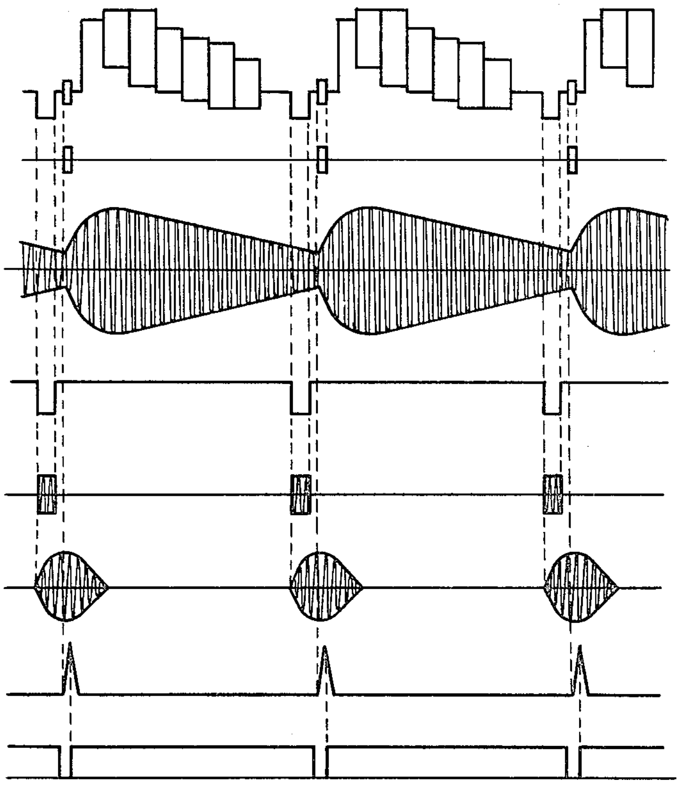

FIG. 4 shows the signals going through these phases. More particularly, FIG. 4A shows a reproduced output signal of the video tape recorder. FIG. 4B shows a burst signal taken out of the reproduced output signal. FIG. 4C shows sustained oscillation of the trigger oscillator 24. The trigger oscillator continues to oscillate during a horizontal line scanning time, while it is gradually attenuated. Its phase error is gradually increased at the same time. This phase error is maximized immediately before the next following burst signal occurs or during the horizontal synchronizing signal time.

If this phase error is produced, the burst signal component and the chrominance signal component differ, from one another, in frequency. When the signals undergo such a frequency change, a change in hue occurs in the reproduced picture. Removal of the differential frequency change requires a control of the natural resonance frequency of the trigger oscillator, in conformity with a change in the value of $f \pm \partial f$.

In the embodiment of the invention described above, the correction removes a differential frequency change. The signal from the demodulator 15 is supplied to a low-pass filter 27, where a luminance signal is filtered out. The luminance signal so filtered out is supplied to a synchronizing signal processing circuit 28. The output of the processing circuit 28 is supplied to a mixer 26, and the other output of the circuit 28 is supplied to a horizontal synchronizing separation circuit 29. The horizontal synchronizing signal separated by the horizontal synchronizing separation circuit 29 is simultaneously supplied to a 1H delay circuit 30 and a phase comparator 31. The horizontal synchronizing signal delayed by the 1H delay circuit 30 is supplied to the phase comparator 31. At the phase comparator 31, the phase of the output of the 1H delay circuit 30 is compared with the phase of the output of the horizontal synchronizing separation circuit 29.

An output of the phase comparator has a voltage responsive to the detection error corresponding to the variations in the video tape recorder. The natural resonance frequency of the trigger oscillator 24 is controlled by the output of the phase comparator 31. Therefore, it is possible to bring the natural resonance frequency of the trigger oscillator into agreement with the frequency of a burst signal. In this manner the large differential frequency change of the burst signal is removed over a wide range. The chrominance signal supplied by the converter 22 and the luminance signal supplied by the synchronizing signal processing circuit 28 are mixed at the mixer 26. A stable NTSC color video signal, having its differential frequency change removed therefrom, is taken out through an output terminal 32.

Figure 2:
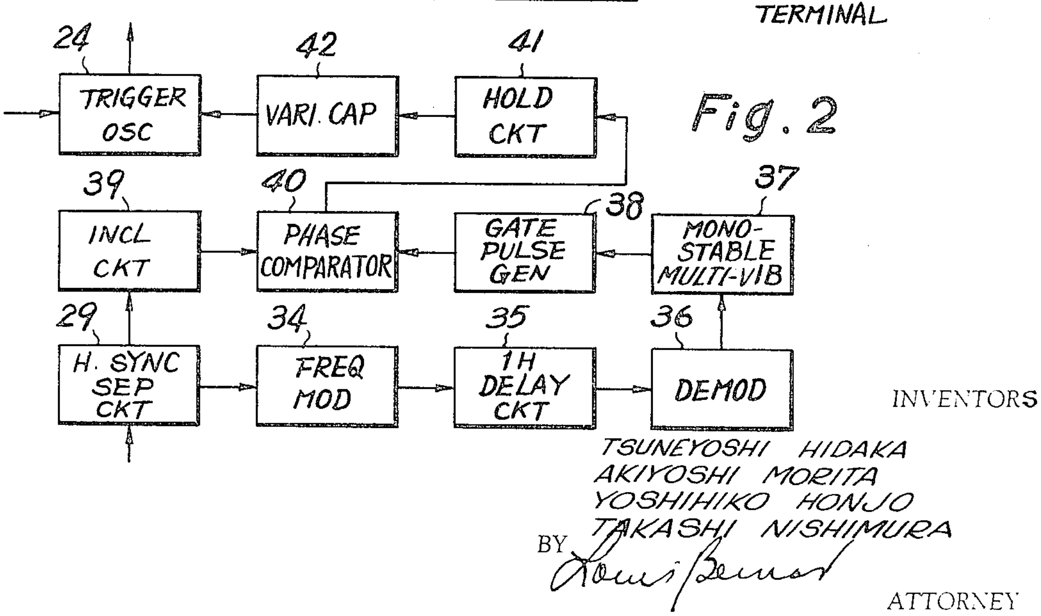
FIG. 2 is a block diagram of an essential sub-assembly portion of the embodiment shown in FIG. 1.

FIG. 2 shows a more detailed block diagram of a portion 33 enclosed by a broken line in FIG. 1. This is an essential part of the above first embodiment. FIG. 3 shows waveforms of the signals in each part in FIG. 2.

Figures 3A, 3B, 3C, 3D, 3E, 3F:
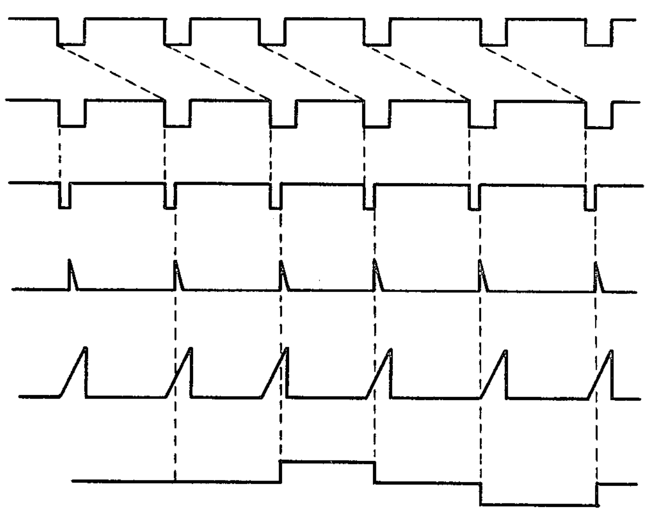
FIGS. 3A to 3F and FIGS. 4A to 4H are respectively graphs showing signals which appear at various points during the operation of the system.

The horizontal synchronizing signal having a waveform shown in FIG. 3A is separated by the horizontal synchronizing separation circuit 29 (FIG. 2) and is fed on one hand to a frequency modulator 34. The output FM signal from the modulator 34 is delayed in one horizontal line scanning time by a 1H delay circuit 35 and thereafter fed to a demodulator 36. As shown in FIG. 3B, the output signal of the demodulator 36 is a signal delayed in one horizontal line scanning time from the signal waveform shown in FIG. 3A.

A monostable multivibrator 37, driven by a front edge of the output waveform of the demodulator 36, generates a pulse of about $2\mu$ sec. in width as shown in FIG. 3C. The resulting pulse is fed to a gate pulse generator 38. The gate pulse generating 38 generates a gate pulse as shown in FIG. 3D by a rear edge of the pulse supplied from the multivibrator 37.

On the other hand, the output of the horizontal synchronizing separation circuit 29 is fed to an inclination circuit 39. The inclination circuit 39 forms an inclined waveform of a phase-voltage conversion as shown in FIG. 3E. The signal having the inclined waveform is fed to a phase comparator 40.

The phase comparator 40 is simultaneously supplied an output from the gate pulse generator 38 with the output the inclination circuit 39. From the phase comparator 40, a voltage corresponding to an inclined portion in the waveform of the signal supplied by the inclination circuit 39 is taken out by the gate pulse supplied by the gate pulse generator 38. The output voltage corresponds to the inclined portion, in conformity with the gate pulse. The output voltage in the waveform shown in FIG. 3F is used as a control signal.

The control signal from the phase comparator 40 is supplied to a holding circuit 41 and applied as a control voltage to continue in a horizontal line scanning time. The control voltage is supplied to a variable capacitor 42 and converted into a charge of electrostatic capacity. The trigger oscillator 24 is controlled at its natural resonance frequency by the capacity in electrostatic charge of the variable capacitor 42. Thus, by an open loop control circuit of the above-mentioned construction, the natural resonance frequency of the trigger oscillator 24 is varied in response to the frequency changes of the signal reproduced from the video tape recorder. And, the frequency changes of a color subcarrier are corrected continuously and stably over a very wide range.

Figure 5:
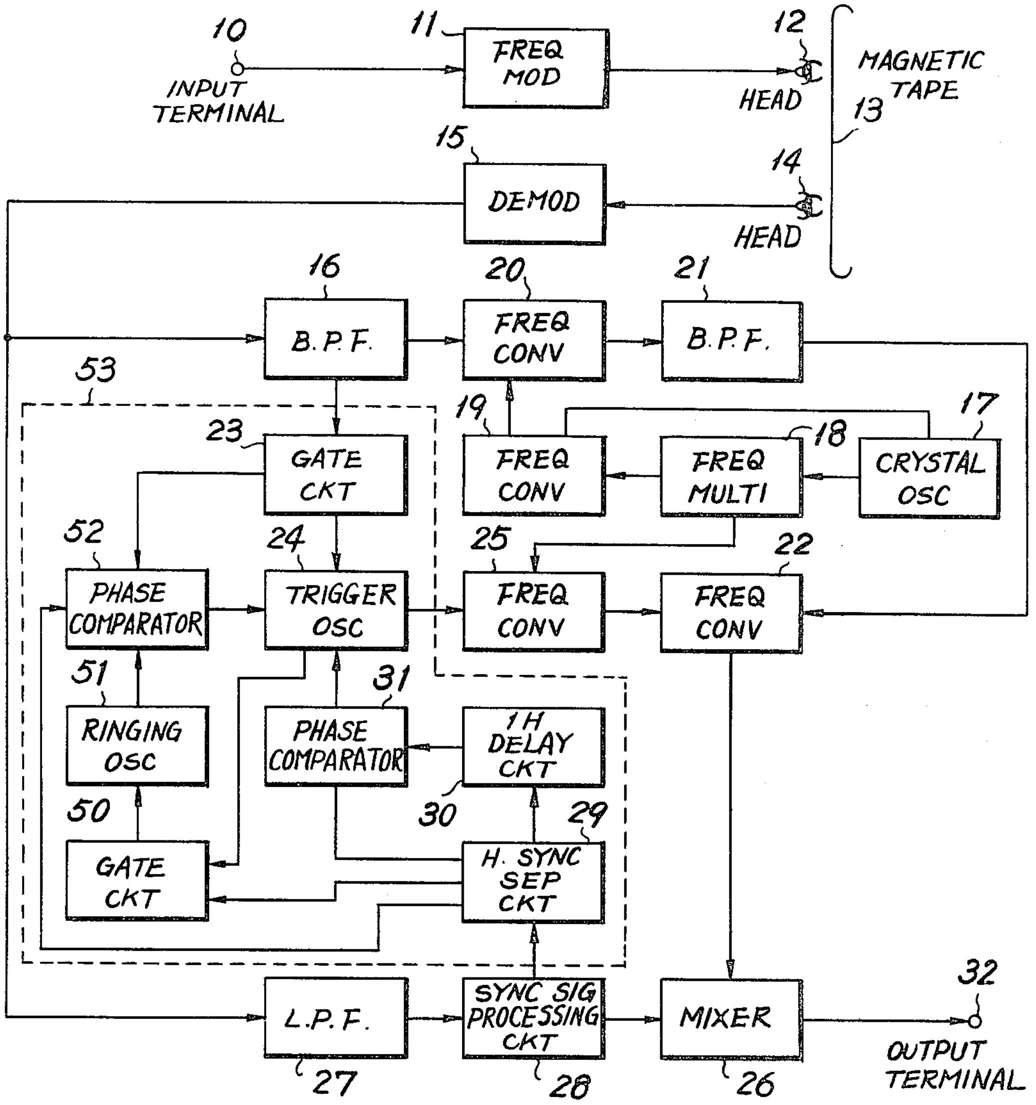
FIG. 5 is a block diagram of a second embodiment of the system according to this invention.

FIG. 5 shows a second embodiment of the present invention. The same reference characters designate similar parts in FIGS. 1 and 5 and a description thereof is omitted at this point. In this embodiment, large frequency and phase errors are corrected by the color AFC circuit, which is open looped with respect to the trigger oscillator 24. Frequency and phase errors in high frequency are completely corrected by the color error cancelling circuit, which is closed looped with respect to the trigger oscillator 24.

The trigger oscillator 24, similar to the above described first embodiment, is controlled by the open loop correction circuit including the horizontal synchronizing separation circuit 29, the 1H delay circuit 30, and the phase comparator 31. The natural resonance frequency of the trigger oscillator 24 always follows the frequency of the burst signal. Therefore, even though the burst signal has wide range frequency changes, the changes are corrected in a very wide range.

At the same time, the output horizontal synchronizing signal from the horizontal synchronizing separation circuit 29 is supplied to a gate circuit 50 and a phase comparator 52. Also an output of the trigger oscillator 24 is supplied to the gate circuit 50. In the gate circuit 50, the oscillation frequency supplied from the trigger oscillator 24 is gated by the horizontal synchronizing signal shown in FIG. 4D and supplied from the horizontal synchronizing separation circuit 29. An output signal shown in FIG. 4E is taken out from the gate circuit 50. This signal is used to sustain oscillation of a ringing oscillator 51, as shown in FIG. 4F.

This output signal of the ringing oscillator 51 is supplied to the phase comparator 52. At the phase comparator 52, the phase of the output signal is compared with the phase of the burst signal supplied from the burst gate circuit 23. The phase comparator 52 is also supplied with a horizontal synchronizing signal from the horizontal synchronizing separation circuit 29. From the phase comparator 52 is obtained a differential detection output, as shown in FIG. 4G, responsive to the phase difference between the output signal of the ringing oscillator 51 and a burst signal of the burst gate circuit 23. This detection output of the phase comparator 52 is held in one horizontal line scanning time as shown in FIG. 4H, and thereafter fed back to the tank circuit of the trigger oscillator 24.

By the closed loop correction circuit of the described construction, it is now possible to correct completely the phase shifts in high frequency. Therefore, by mixing a chrominance signal from the frequency converter 22 with a luminance signal from the synchronizing signal processing circuit 28 through the mixer 26, a very stable reproduced NTSC color video signal can be taken out from the output terminal 32.

Figure 6:
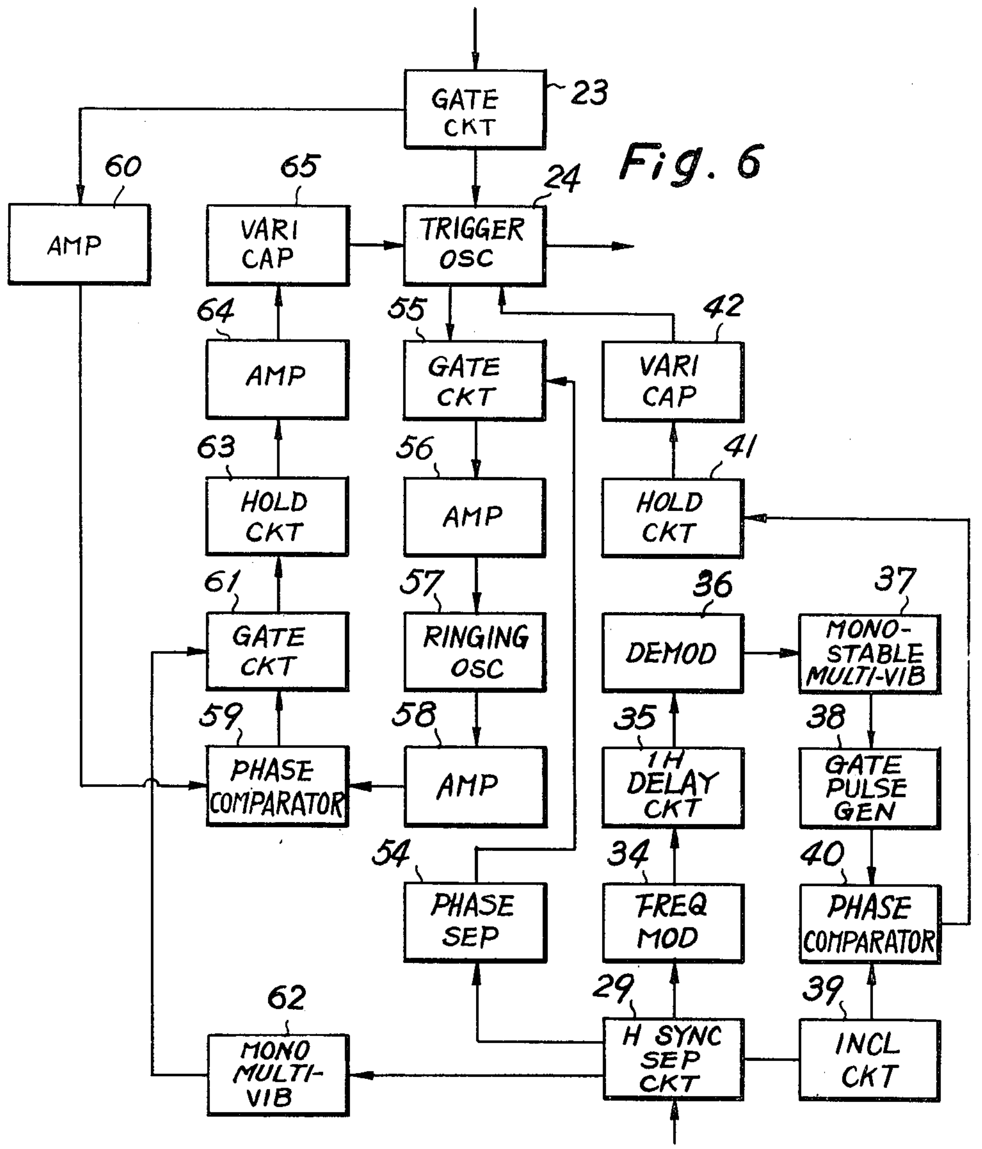
FIG. 6 is a block diagram of essential portions of the embodiment shown in FIG. 5.

FIG. 6 shows a more detailed block diagram of a portion 53 enclosed by a broken line in FIG. 5 as the essential part of the second embodiment described above. The same reference characters designate similar parts in FIGS. 2 and 6, and a description thereof is omitted at this point.

In FIG. 6, the horizontal synchronizing separation circuit 29 supplies a horizontal synchronizing signal through a phase separation circuit 54 to a gate circuit 55. At the gate circuit 55, the oscillation signal supplied from the trigger oscillator 24 is gated by the horizontal synchronizing signal, as shown in FIG. 4E. The gated signal is amplified by an amplifier 56 and supplied to sustain the oscillation of a ringing oscillator 57, as shown in FIG. 4F. The output of the oscillator 57 is supplied through an amplifier 58 to a phase comparator 59. At the same time, a burst signal is supplied from the burst gate circuit 23 through an amplifier 60 to the phase comparator 59. At the phase comparator 59, the phase of the output of the oscillator 57 is compared with the phase of the burst signal, and an output corresponding to the phase error is supplied to a gate circuit 61.

A monostable multivibrator 62 is supplied with a horizontal synchronizing signal derived from the horizontal synchronizing separation circuit 29. The output from the multivibrator 62 is supplied to the gate circuit 61 which is gated thereby to take out a portion of the output corresponding to the error, as shown in FIG. 4G. The output of the gate circuit 61 is held at a holding circuit 63 by the peak value of the wave-shape of the detected error during a horizontal line scanning time, as shown in FIG. 4H. The resulting signal is amplified by an amplifier 64, and supplied to a variable capacitor 65 where it is converted into an electrostatic charge. The capacity in electrostatic capacity is fed back to the tank circuit of the trigger oscillator 24. Thus, the natural resonance frequency of the oscillator 24 is controlled by a closed loop circuit with respect to the oscillator.

In the present invention the trigger oscillator circuit means is controlled by the phase comparing detection error of the phase comparator comparing the phase of the horizontal synchronizing signal separated from the luminance signal with the phase of the horizontal synchronizing signal delayed in one horizontal line scanning time. Therefore, it is possible to correct, more stably, an NTSC color video signal reproduced from a color video tape recorder and to remove substantially all of the differential frequency changes and differential phase errors in a higher frequency range. Thus, it is possible to produce a stable reproduced signal with no change in hue.

It should be understood that the appended claims are intended to cover all equivalents falling within the true scope and spirit of the invention.

What we claim is:

1. A color video signal correction system comprising first filter means for filtering out a chrominance signal from a color video signal, first frequency converter means responsive to a first predetermined frequency for changing the frequency of the chrominance signal supplied by said first filter means, gating means for taking out a burst signal from said chrominance signal, trigger oscillator circuit means actuated by said burst signal, means for controlling the oscillation of said trigger oscillator comprising second frequency converter means operated responsive to a second predetermined frequency for changing the frequency of the output of said trigger oscillator, third frequency converter means for mixing the outputs of said first and second frequency converter means to produce a chrominance signal with a frequency differential removed therefrom, second filter means for filtering out a luminance signal from a color video signal, means for mixing said luminance signal and said chrominance signal produced by said third frequency converter means, said means for controlling the oscillation of said trigger oscillator further including an open loop control circuit comprising means for separating a horizontal synchronizing signal from the luminance signal supplied by said second filter means, means for delaying the horizontal synchronizing signal supplied by said separation means for a delay time period equal to one horizontal line scanning time, means for comparing the phase of the horizontal synchronizing signal supplied by said separating means with the phase of the delayed signal supplied by said delay means, and said trigger oscillator being controlled in its natural resonance frequency to follow up the frequency changes of said burst signal responsive to a detected differential output of said phase comparing means.

2. The system of claim 1 in which said means for controlling the oscillation of said trigger oscillator comprises means for separating a horizontal synchronizing signal from the luminance signal supplied by said second filter means, means for delaying the horizontal synchronizing signal supplied by said separation means in one horizontal line scanning time, means for generating a gate pulse from the output of said delay means, means for forming an inclined waveform signal of a phase-voltage conversion from the horizontal synchronizing signal supplied by said separation means, and means for comparing the phase of the gate pulse supplied by said gate pulse generating means with the phase of the inclined waveform signal supplied by said inclined waveform signal forming means.

3. The system of claim 1 in which said means for controlling the oscillation of said trigger oscillator comprises means for separating a horizontal synchronizing signal from the luminance signal supplied by said second filter means, means for frequency modulating the synchronizing signal from said separation means, means for delaying the output of said frequency modulating means in one horizontal line scanning time, means for demodulating the output of said delay means, multivibrator circuit means driven by the output of said demodulating means, means for generating a gate pulse by the output of said multivibrator, means for forming an inclined waveform signal of a phase-voltage conversion from the synchronizing signal of a phase-voltage conversion from the synchronizing signal supplied by said separation means, means for comparing the phase of the gate pulse supplied by said gate pulse generating means with the phase of the inclined waveform supplied by said inclined waveform forming means, circuit means for holding the output of said phase comparing means in one horizontal line scanning time, and means comprising a variable capacitor for converting the output of said holding circuit means into an electrostatic charge, said trigger oscillator having a tank circuit controlled by the capacity variations of said variable capacitor.

4. The system of claim 1 further having a closed loop control circuit comprising circuit means responsive to the horizontal synchronizing signal supplied by said horizontal synchronizing separation circuit for gating the oscillation output of said trigger oscillator, ringing oscillator circuit means driven by the gated output signal of said gate circuit means, and phase comparator circuit means for comparing the phase of the oscillation output of said ringing oscillator with the phase of the burst signal taken out of said chrominance signal, said trigger oscillator being further controlled by the output of said phase comparator means of said closed loop control circuit.

5. The system of claim 3 further having a closed loop control circuit comprising circuit means responsive to the horizontal synchronizing signal supplied by said horizontal synchronizing separation circuit for gating the oscillation output of said trigger oscillator, ringing oscillator circuit means driven by the gated output signal of said gate circuit means, and phase comparator circuit means for comparing the phase of the oscillation output of said ringing oscillator with the phase of the burst signal taken out of said chrominance signal, said trigger oscillator being further controlled by the output of said phase comparator means of said closed loop control circuit.

6. The system of claim 1 further having a closed loop control circuit comprising circuit means responsive to the horizontal synchronizing signal supplied by said horizontal synchronizing separation circuit for gating the oscillation output of said trigger oscillator, ringing oscillator circuit means driven by the gated output signal of said gate circuit means, phase comparator circuit means for comparing the phase of the oscillation output of said ringing oscillator with the phase of the burst signal taken out of said chrominance signal, means for gating the output of said phase comparator means by the horizontal synchronizing signal supplied by the horizontal synchronizing separation circuit, holding circuit means for holding the output of said gating means in one horizontal line scanning time, and means comprising a variable capacitor coupled to said holding means for converting a signal from said phase comparator into an electrostatic charge, said trigger oscillator having a tank circuit controlled by the capacity variations of said variable capacitor.

7. The system of claim 3 further having a closed loop control circuit comprising circuit means responsive to the horizontal synchronizing signal supplied by said horizontal synchronizing separation circuit for gating the oscillation output of said trigger oscillator, ringing oscillator circuit means driven by the gated output signal of said gate circuit means, phase comparator circuit means for comparing the phase of the oscillation output of said ringing oscillator with the phase of the burst signal taken out of said chrominance signal, means responsive to the horizontal synchronizing signal supplied by the horizontal synchronizing separation circuit for gating the output of said phase comparator means, holding circuit means for holding the output of said gating means in one horizontal line scanning time, and means comprising a variable capacitor for converting the output of the phase comparator circuit into an electrostatic charge, said trigger oscillator having a tank circuit controlled by the capacity variations of said variable capacitor.

* * * * *